(12) United States Patent
Rita et al.

(10) Patent No.: US 11,374,363 B2
(45) Date of Patent: Jun. 28, 2022

(54) PLUGGABLE MODULE HAVING EMI PREVENTION FINS IN AIRFLOW CHANNEL

(71) Applicant: TE CONNECTIVITY CORPORATION, Berwyn, PA (US)

(72) Inventors: Jacob Rita, Conshohocken, PA (US); Eric David Briant, Dillsburg, PA (US); Michael John Phillips, Camp Hill, PA (US); Alex Michael Sharf, Harrisburg, PA (US); Richard James Long, Columbia, PA (US)

(73) Assignee: TE CONNECTIVITY SERVICES GmbH, Schaffhausen (CH)

( * ) Notice: Subject to any disclaimer, the term of this patent is extended or adjusted under 35 U.S.C. 154(b) by 0 days.

(21) Appl. No.: 16/992,782

(22) Filed: Aug. 13, 2020

(65) Prior Publication Data
US 2021/0066859 A1     Mar. 4, 2021

Related U.S. Application Data

(60) Provisional application No. 62/895,785, filed on Sep. 4, 2019.

(51) Int. Cl.
*H01R 13/6581* (2011.01)
*H01R 13/66* (2006.01)

(52) U.S. Cl.
CPC ..... *H01R 13/6581* (2013.01); *H01R 13/6691* (2013.01)

(58) Field of Classification Search
CPC .......................... G02B 6/4269; G02B 6/4277; H01R 13/6581; H01R 13/6594; H01R 13/6691; H05K 7/20; H05K 7/20409
See application file for complete search history.

(56) References Cited

U.S. PATENT DOCUMENTS

| | | | |
|---|---|---|---|
| 9,419,380 B2 | 8/2016 | Sharf et al. | |
| 9,509,102 B2 | 11/2016 | Sharf et al. | |
| 9,882,297 B2 | 1/2018 | Regnier | |
| 10,490,952 B2 * | 11/2019 | Briant | H01R 12/58 |
| 10,551,580 B2 * | 2/2020 | Regnier | G02B 6/4278 |
| 11,073,336 B2 * | 7/2021 | Chen | G02B 6/4269 |
| 2016/0211623 A1 * | 7/2016 | Sharf | G02B 6/4269 |
| 2018/0034211 A1 * | 2/2018 | Little | H01R 13/642 |

* cited by examiner

*Primary Examiner* — Oscar C Jimenez

(57) ABSTRACT

A pluggable module includes a pluggable body having an upper shell at the top and a lower shell at the bottom that define an interior chamber. The upper shell includes side walls extending to the top and an upper wall extending between the side walls. The upper shell includes an airflow channel and EMI prevention fins having EMI channels therebetween in flow communication with the airflow channel. The upper wall along the airflow channel is at a first depth from the top and the upper wall along the EMI channels is at a second depth deeper than the first depth.

22 Claims, 5 Drawing Sheets

PLUGGABLE MODULE HAVING EMI PREVENTION FINS IN AIRFLOW CHANNEL

CROSS REFERENCE TO RELATED APPLICATIONS

This application claims benefit to U.S. Provisional Application No. 62/895,785, filed 4 Sep. 2019, titled "PLUGGABLE MODULE HAVING EMI PREVENTION FINS IN AIRFLOW CHANNEL", the subject matter of which is herein incorporated by reference in its entirety.

BACKGROUND OF THE INVENTION

The subject matter herein relates generally to pluggable modules having efficient cooling capabilities.

At least some known communication systems include receptacle assemblies, such as input/output (I/O) connector assemblies, that are configured to receive a pluggable module and establish a communicative connection between the pluggable module and an electrical communication connector of the receptacle assembly. As one example, a known receptacle assembly includes a cage member that is mounted to a circuit board and configured to receive a pluggable transceiver in an elongated cavity of the cage member. The pluggable module and the electrical connector have respective electrical contacts that engage one another to establish a communicative connection.

Electrical shielding of the components of the communication system is typically achieved using a receptacle housing or cage that provides shielding around the module cavity that receives the pluggable module. Gaskets are provided in the opening to interface with the pluggable module. However, as data speeds through the communication system increase, heat generated by the components is likewise increased. Heat dissipation from the components is problematic. Some known communication systems provide airflow channels along the pluggable module to provide cooling for the pluggable module, the communication connector or other components of the system. However, the airflow channels define large openings, which is problematic for EMI containment. Additionally, the airflow channels increase the height of the pluggable module and/or reduce the space in the interior of the pluggable module for components and routing wires.

Accordingly, there is a need for a communication system having pluggable modules having sufficient EMI containment and efficient cooling.

BRIEF DESCRIPTION OF THE INVENTION

In accordance with embodiments herein, a pluggable module is provided including a pluggable body having a top and a bottom. The pluggable body extends between a cable end and a mating end. The mating end is receivable in a module cavity of a receptacle assembly to mate with a communication connector. The pluggable body has an upper shell at the top and a lower shell at the bottom. The upper shell and the lower shell define an interior chamber. The upper shell includes side walls extending to the top and an upper wall extending between the side walls. The upper shell includes an airflow channel along an exterior of the upper wall between the side walls allowing airflow between the cable end and the mating end. The upper shell includes a plurality of EMI prevention fins along the upper wall having EMI channels between the EMI prevention fins. The EMI channels are in flow communication with the airflow channel. The upper wall along the airflow channel is at a first depth from the top and the upper wall along the EMI channels is at a second depth deeper than the first depth. The pluggable module includes a communication circuit board held in the interior chamber of the pluggable body and is exposed at the mating end. The pluggable body is configured to be plugged into the receptacle assembly such that the communication circuit board is communicatively coupled to the communication connector of the receptacle assembly. A cable extends into the interior chamber of the pluggable body at the cable end. The cable is coupled to the communication circuit board in the interior chamber.

In another embodiment, a pluggable module is provided including a pluggable body having a top and a bottom. The pluggable body extends between a cable end and a mating end. The mating end is receivable in a module cavity of a receptacle assembly to mate with a communication connector. The pluggable body has an upper shell at the top and a lower shell at the bottom. The upper shell and the lower shell define an interior chamber. The upper shell includes side walls extending to the top and an upper wall extending between the side walls. The upper shell includes an airflow channel along an exterior of the upper wall between the side walls allowing airflow between the cable end and the mating end. The upper shell includes a plurality of EMI prevention fins along the upper wall having EMI channels between the EMI prevention fins. The EMI channels are in flow communication with the airflow channel and allow airflow through the EMI channels. The airflow channel has a first channel cross-sectional area. The EMI channels have a second channel cross-sectional area equal to the first channel cross-sectional area. The pluggable module includes a communication circuit board held in the interior chamber of the pluggable body and exposed at the mating end. The pluggable body is configured to be plugged into the receptacle assembly such that the communication circuit board is communicatively coupled to the communication connector of the receptacle assembly. A cable extends into the interior chamber of the pluggable body at the cable end. The cable is coupled to the communication circuit board in the interior chamber.

In a further embodiment, a pluggable module is provided including a pluggable body having a top and a bottom. The pluggable body extends between a cable end and a mating end. The mating end is receivable in a module cavity of a receptacle assembly to mate with a communication connector. The pluggable body has an upper shell at the top and a lower shell at the bottom. The upper shell and the lower shell define an interior chamber. The lower shell has side walls and a lower wall between the side walls at the bottom. The upper shell includes side walls extending to the top and an upper wall extending between the side walls. The side walls of the upper shell are coupled to the side walls of the lower shell. The upper shell includes an airflow channel along an exterior of the upper wall between the side walls allowing airflow between the cable end and the mating end. The upper shell includes a plurality of EMI prevention fins along the upper wall having EMI channels between the EMI prevention fins. The EMI channels are in flow communication with the airflow channel. The interior chamber has a wide section having a first height between the lower wall and the upper wall. The interior chamber has a narrow section having a second height shorter than the first height between the lower wall and the upper wall. The wide section is aligned below the airflow channel. The narrow section is aligned below the EMI channels. The pluggable module includes a communication circuit board held in the interior chamber of the pluggable body and exposed at the mating end. The pluggable body is configured to be plugged into the receptacle assembly such that the communication circuit board is communicatively coupled to the communication connector of the receptacle assembly. A cable extends into the interior chamber of the pluggable body at the cable end. The cable is coupled to the communication circuit board in the interior chamber.

DETAILED DESCRIPTION OF THE INVENTION

Figure 1:
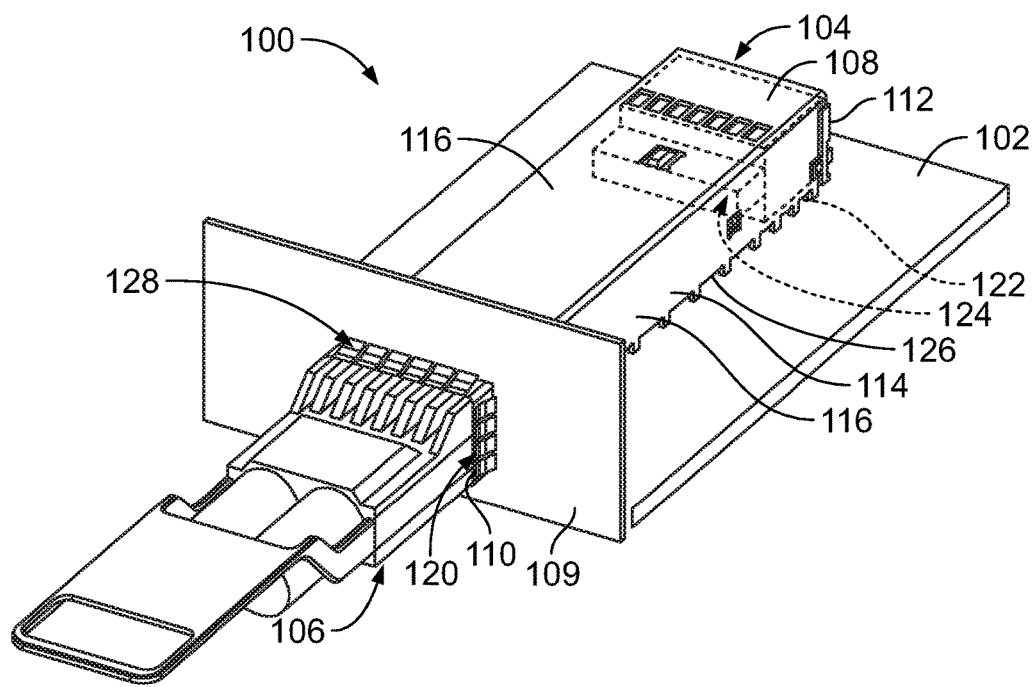
FIG. 1 is a front perspective view of a communication system in accordance with an embodiment.

FIG. 1 is a front perspective view of a communication system 100 in accordance with an embodiment. The communication system 100 includes a circuit board 102, a receptacle assembly 104 mounted to the circuit board 102, and a pluggable module 106 that is configured to be received in the receptacle assembly 104. The circuit board 102 may be a daughter card or a mother board and include conductive traces (not shown) extending therethrough. Optionally, the pluggable module 106 may be communicatively coupled to the receptacle assembly 104, such as to a communication connector, to send and/or receive data signals with components of the communication system 100.

The communication system 100 may be part of or used with telecommunication systems or devices. For example, the communication system 100 may be part of or include a switch, router, server, hub, network interface card, or storage system. In the illustrated embodiment, the pluggable module 106 is configured to transmit data signals in the form of electrical signals. In other embodiments, the pluggable module 106 may be configured to transmit data signals in the form of optical signals. The circuit board 102 may be a daughter card or a mother board and include conductive traces (not shown) extending therethrough.

In the illustrated embodiment, the receptacle assembly 104 is illustrated as a single port receptacle assembly configured to receive a single pluggable module 106; however, the receptacle assembly 104 may be a multi-port receptacle assembly in other embodiments configured to receive pluggable modules 106 in multiple ports. For example, the multiple ports of the receptacle assembly 104 may be ganged side-by-side and/or stacked in addition to, or alternative to, ganged ports.

The pluggable module 106 is an input/output (I/O) module configured to be inserted into and removed from the receptacle assembly 104. For example, the pluggable module 106 may be a small form-factor pluggable (SFP) transceiver or quad small form-factor pluggable (QSFP) transceiver, such as those satisfying certain technical specifications for SFP or QSFP transceivers, such as Small-Form Factor (SFF)-8431. By way of example, the pluggable module 106 may be used in place of transceivers which are part of the SFP+ product family available from TE Connectivity.

The receptacle assembly 104 includes a cage member 108 that is mounted to the circuit board 102. The cage member 108 may be arranged at a bezel or panel 109 of a chassis of the system or device, such as through an opening in the panel 109. As such, the cage member 108 is interior of the device and corresponding panel 109 and the pluggable module(s) 106 is loaded into the cage member 108 from outside or exterior of the device and corresponding panel 109. Optionally, the panel 109 may include a plurality of openings each configured to receive a corresponding pluggable module 106. In other various embodiments, the opening in the panel 109 may be sized to receive multiple pluggable modules 106, such as when a multi-port receptacle assembly 104 is used.

The cage member 108 includes a front end 110 and an opposite rear end 112. The front end 110 may be provided at, and extend through an opening in, the panel 109. Relative or spatial terms such as "front," "rear," "top," or "bottom" are only used to distinguish the referenced elements and do not necessarily require particular positions or orientations in the communication system 100 or in the surrounding environment of the communication system 100. For example, the front end 110 may be located in or facing a back portion of a larger telecommunication system. In many applications, the front end 110 is viewable to a user when the user is inserting the pluggable module 106 into the receptacle assembly 104. The pluggable module 106 is accessible to the user and viewable to the user when the pluggable module 106 is inserted into the receptacle assembly 104.

The cage member 108 is configured to contain or block interference, such as electromagnetic interference (EMI), and guide the pluggable module(s) 106 during a mating operation. To this end, the cage member 108 includes multiple pieces assembled together to enclose the pluggable module 106. For example, the pieces may be snap-fit together and/or welded together. When the cage member 108 is mounted to the circuit board 102, the cage member 108 is electrically coupled to the circuit board 102 and, in particular, to ground planes (not shown) within the circuit board 102 to electrically ground the cage member 108. As such, the receptacle assembly 104 may reduce EMI that may negatively affect electrical performance of the communication system 100. The pluggable module 106 may be electrically commoned with or grounded to the cage member 108, such as for EMI containment and/or shielding. For example, the pluggable module 106 may directly engage a portion of the cage member 108, such as an EMI gasket at the opening to the cage member 108.

In an exemplary embodiment, the cage member 108 includes a receptacle housing 114 defined by a plurality of housing panels or walls 116, which may be formed from one or more pieces. The various walls 116 provide shielding for vulnerable areas of other components, such as by covering or shielding openings in walls of the other components. The receptacle housing 114 extends between the front end 110 and the rear end 112. The walls 116 are formed from conductive material, such as sheet metal and/or a polymer having conductive particles. In the illustrated embodiment, the pieces are stamped and formed from sheet metal. In some embodiments, the cage member 108 is configured to facilitate airflow through the cage member 108 to transfer heat (or thermal energy) away from the receptacle assembly 104 and the pluggable module(s) 106. The air may flow from inside the cage member 108 (for example, behind the panel 109) to the external environment (for example, forward of the panel 109) or from outside the cage member 108 into the interior of the cage member 108. Fans or other air moving devices may be used to increase airflow through the cage member 108 and over the pluggable module(s) 106.

The receptacle housing 114 defines a module cavity 120 extending between the front and rear ends 110, 112. The module cavity 120 receives the pluggable module 106. The module cavity 120 extends lengthwise in a direction that is parallel to the plugging axis of the pluggable module 106. For a multi-port receptacle assembly 104, multiple module cavities 120 or ports are defined for receiving multiple pluggable modules 106. In such embodiments, the module cavities 120 may be stacked vertically and/or ganged horizontally. Separator panels may be provided between the module cavities 120 to provide shielding between the module cavities 120.

The receptacle assembly 104 includes a communication connector 122 (shown in phantom in FIG. 1) having a mating interface 124 for mating with the pluggable module 106. The communication connector 122 may have multiple mating interfaces when configured to mate with multiple pluggable modules 106, such as when used in a stacked cage member. The communication connector 122 is disposed at the rear end of the module cavity 120. In an exemplary embodiment, the communication connector 122 is provided at or near the rear end 112 of the cage member 108. The communication connector 122 includes electrical contacts (not shown) that are configured to be mated with the pluggable module 106. The communication connector 122 is configured to be mounted to the circuit board 102. The communication connector 122 is configured to be received in the cage member 108 through a bottom 126 of the cage member 108. For example, the cage member 108 is configured to be mounted to the circuit board 102 over the communication connector 122 such that the communication connector 122 passes through an opening in the bottom 126 as the cage member 108 is mounted to the circuit board 102.

In an exemplary embodiment, the receptacle assembly 104 includes an EMI gasket 128 at the front end 110 of the receptacle housing 114. The EMI gasket 128 interfaces with the panel 109, such as within the opening in the panel 109 that receives the receptacle assembly 104. The EMI gasket 128 may be one or more separate pieces, which may be attached to the receptacle housing 114, such as by clipping onto the receptacle housing 114, welding to the receptacle housing 114 or otherwise being secured to the receptacle housing 114. In other various embodiments, the EMI gasket 128 may be integral with the receptacle housing 114, such as being stamped and formed out of or extending from the walls 116 of the receptacle housing 114. The EMI gasket 128 may extend into the module cavity 120 to engage the pluggable module 106.

Figure 2:
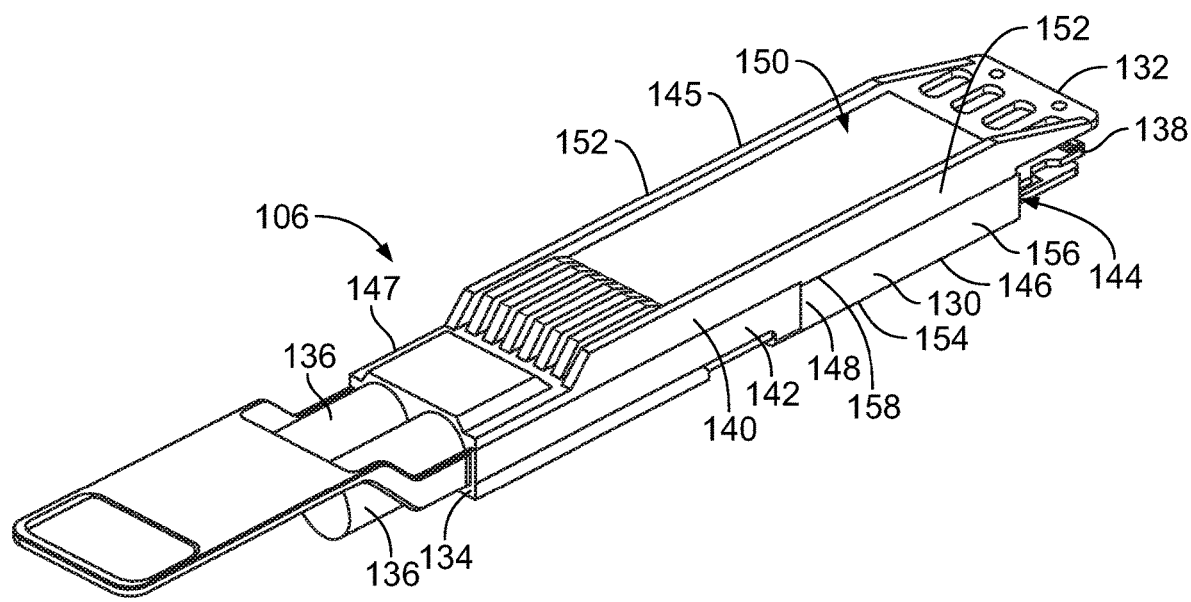
FIG. 2 is a front perspective view of the pluggable module in accordance with an exemplary embodiment.
Figure 3:
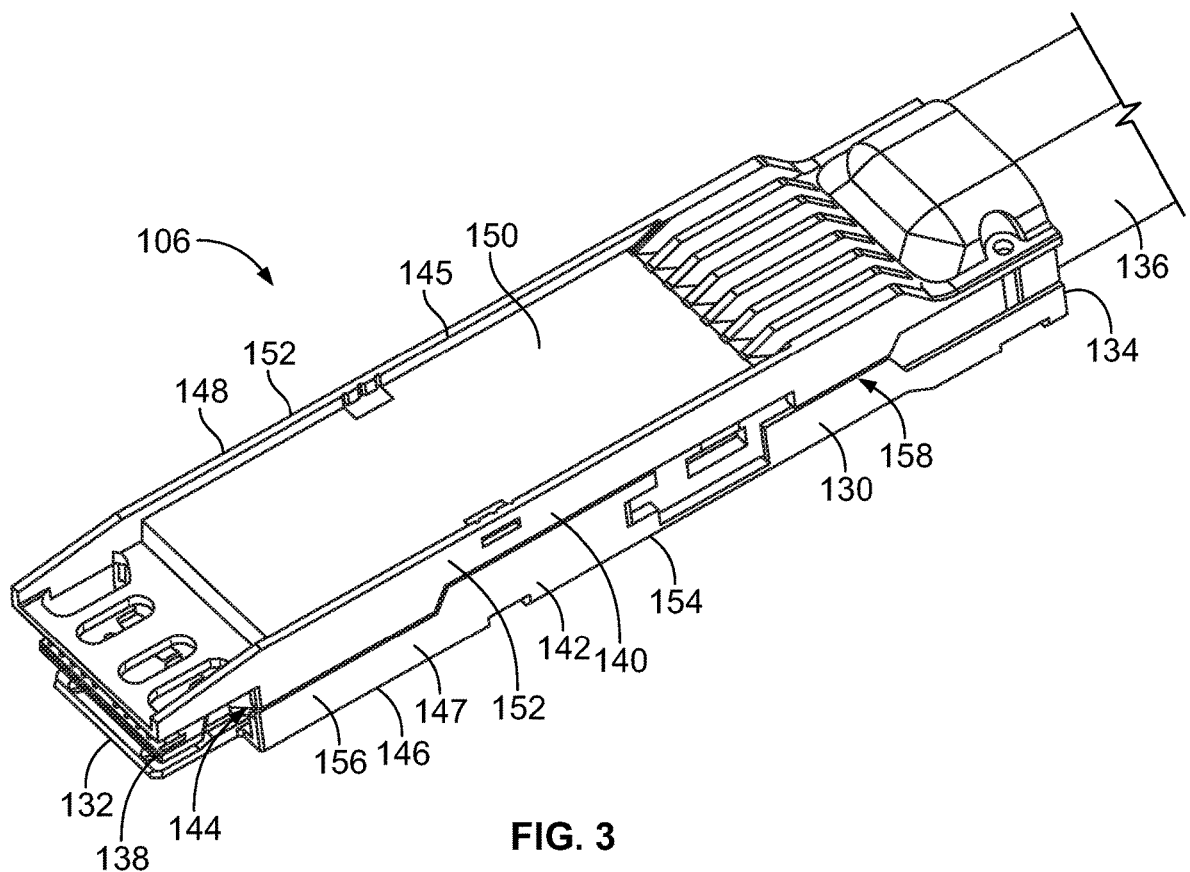
FIG. 3 is a rear perspective view of the pluggable module in accordance with an exemplary embodiment.

FIG. 2 is a front perspective view of the pluggable module 106 in accordance with an exemplary embodiment. FIG. 3 is a rear perspective view of the pluggable module 106 in accordance with an exemplary embodiment. The pluggable module 106 has a pluggable body 130, which may be defined by one or more shells. For example, in the illustrated embodiment, the pluggable body 130 includes an upper shell 140 and a lower shell 142. The pluggable body 130 may be thermally conductive and/or may be electrically conductive, such as to provide EMI shielding for the pluggable module 106. The pluggable body 130 includes a rear end or mating end 132 and an opposite front end or cable end 134. The mating end 132 is configured to be inserted into the module cavity 120 (shown in FIG. 1) for mating with the communication connector 122 (shown in FIG. 1). The cable end 134 has one or more cables 136 extending to another component within the system. The cable end 134 is exposed forward of the panel 109 from the exterior of the receptacle assembly 104.

The pluggable body 130 includes a communication circuit board 138 held within the pluggable body 130, such as in an interior chamber 144 defined by the upper and lower shells 140, 142. The communication circuit board 138 is configured to be communicatively coupled to the communication connector 122 (shown in FIG. 1). The communication circuit board 138 may be accessible or exposed at the mating end 132. The cables 136 are terminated to the communication circuit board 138, such as directly or through a connector on the communication circuit board 138. The cables 136 may include copper wires transmitting electrical signals or may include fiber optic cables transmitting optical signals. The communication circuit board 138 has communication components (not shown) connected thereto for transmitting the signals between the cables 136 and the mating end of the communication circuit board 138. For example, the communication circuit board 138 may have conductors, traces, pads, electronics, optical modules, sensors, controllers, switches, inputs, outputs, and the like associated with the communication circuit board 138, which may be mounted to the communication circuit board 138, to form circuits and to control operation of the pluggable module 106.

The pluggable module 106 includes an outer perimeter defining an exterior of the pluggable body 130. The exterior extends between the mating end 132 and the cable end 134 of the pluggable module 106. The exterior is defined by one or more surfaces of the pluggable body 130. For example, the exterior may be defined by a top 145, a bottom 146 and opposite first and second sides 147, 148 of the pluggable body 130.

In an exemplary embodiment, the pluggable body 130 provides heat transfer for the communication circuit board 138, such as for the electronic components on the communication circuit board 138. For example, the communication circuit board 138 is in thermal communication with the pluggable body 130 and the pluggable body 130 transfers heat from the communication circuit board 138.

The upper and lower shells 140, 142 are coupled together to form the pluggable body 130. The upper shell 140 has an upper wall 150 and upper side walls 152 at the top 145 and the lower shell 142 has a lower wall 154 and lower side walls 156 at the bottom 146. The lower wall 154, the upper wall 150, the lower side walls 156 and the upper side walls 152 form the interior chamber 144. The upper and lower side walls 152, 156 are coupled together to form the pluggable body 130. For example, the side walls 152, 156 may meet at a seam 158 around the exterior. The side walls 152, 156 may have similar heights such that the seam 158 is approximately centered between the top 145 and the bottom 146. In an exemplary embodiment, the upper shell 140 and the lower shell 142 are die cast components manufactured from metal materials using dies or tools to cast the parts; however, the shells 140, 142 may be manufactured by other processes in alternative embodiments, such as molding, milling, machining, extruding, stamping, forming, and the like.

Figure 4:
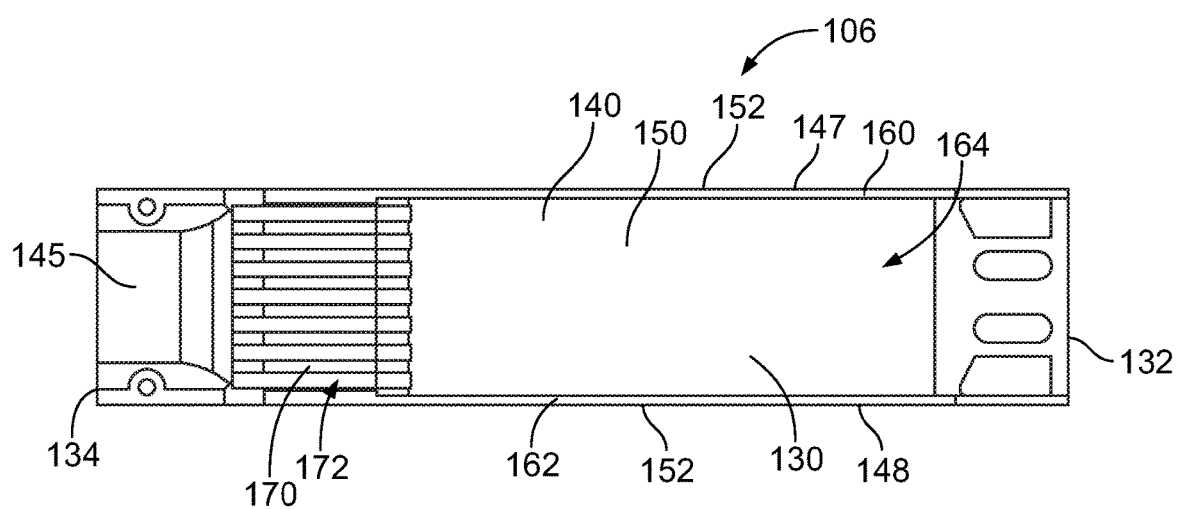
FIG. 4 is a top view of the pluggable module showing the upper shell in accordance with an exemplary embodiment.
Figure 5:
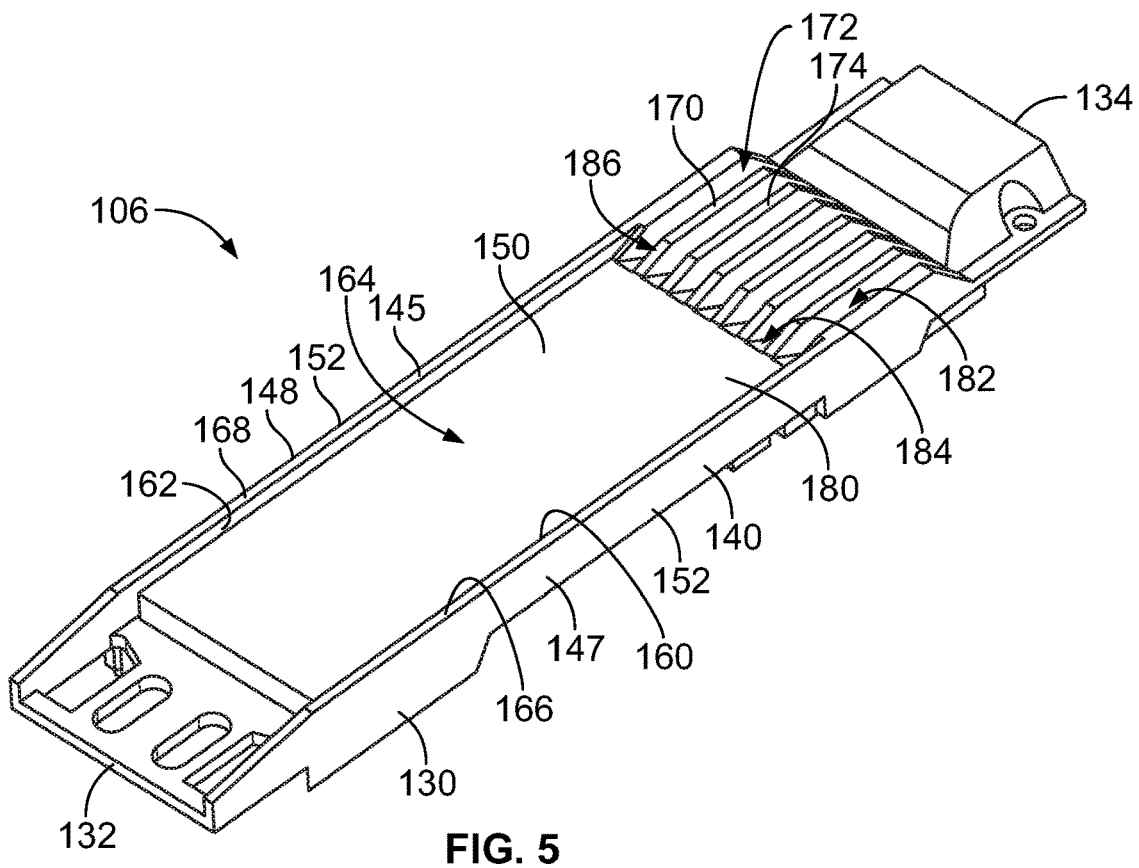
FIG. 5 is a top perspective view of a portion of the pluggable body showing the upper shell in accordance with an exemplary embodiment.
Figure 6:
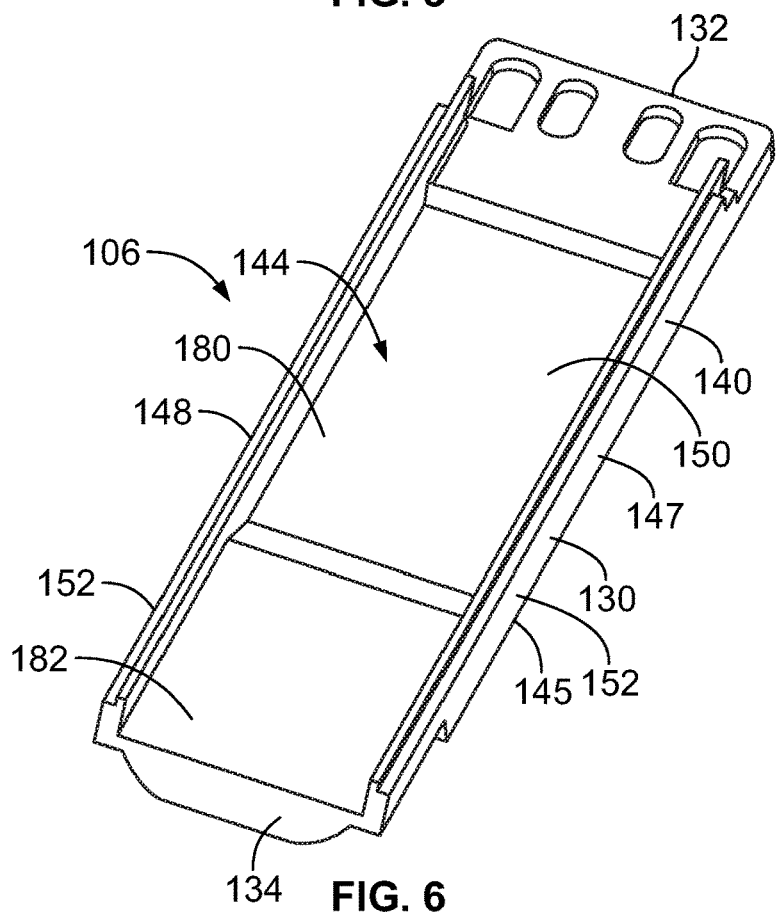
FIG. 6 is a bottom perspective view of a portion of the pluggable body showing the bottom of the upper shell in accordance with an exemplary embodiment.

FIG. 4 is a top view of the pluggable module 106 showing the upper shell 140 in accordance with an exemplary embodiment. FIG. 5 is a top perspective view of a portion of the pluggable body 130 showing the upper shell 140 in accordance with an exemplary embodiment. FIG. 6 is a bottom perspective view of a portion of the pluggable body 130 showing the bottom of the upper shell 140 in accordance with an exemplary embodiment. In an exemplary embodiment, the upper shell 140 is an integral unitary structure. For example, as noted above, the upper shell 140 may be a die cast structure where the portions, walls, and features are integral with each other to form a unitary one-piece body. As such, the portions, walls, and features do not include thermal interfaces therebetween, but rather the entire, one-piece structure of the upper shell 140 may be used to dissipate heat from the communication components and do not require assembly.

The upper shell 140 has lips 160, 162 at the side walls 152 at the first and second sides 147, 148. The lips 160, 162 are planar and parallel to each other. The lips 160, 162 may extend any length between the cable end 134 and the mating end 132, such as substantially the entire length, as in the illustrated embodiment. The lips 160, 162 may have angled ends defining lead-in surfaces to guide loading of the pluggable module 106 into the module cavity 120. The lips 160, 162 extend to outer edges 166, 168, respectively, of the side walls 152. In an exemplary embodiment, the outer edges 166, 168 are coplanar and parallel along the length of the pluggable body 130.

The upper shell 140 includes an airflow channel 164 along the exterior of the upper wall 150 between the lips 160, 162 at the top of the side walls 152. The airflow channel 164 allows airflow between the cable end 134 and the mating end 132. The airflow may be used to cool the upper shell 140, components held within the pluggable body 130, such as the communication components of the communication circuit board 138, and/or to cool other components, such as the communication connector 122 or other components within the system 100. The air may flow from front-to-back or from back-to-front within the airflow channel 164. In an exemplary embodiment, the airflow channel 164 spans the entire width of the upper shell 140 between the lips 160, 162

The upper shell 140 includes a plurality of EMI prevention fins 170 along at least a portion of the upper wall 150. The EMI prevention fins 170 are positioned between the side walls 152 and optionally extend longitudinally and parallel to the side walls 152. In the illustrated embodiment, the EMI prevention fins 170 are parallel plates that extend lengthwise; however, the EMI prevention fins 170 may have other shapes in alternative embodiments, such as cylindrical or other shaped posts. The EMI prevention fins 170 extend to distal edges 174. In an exemplary embodiment, the distal edges 174 are coplanar with the outer edges 166, 168 of the side walls 152. In various embodiments, the upper shell 140 may include a cover over the EMI prevention fins 170, such as at the distal edges 174. The cover may provide additional EMI shielding. The cover may provide a flat surface for the gasket to engage.

The EMI prevention fins 170 define EMI channels 172. The EMI channels 172 are narrow enough to restrict EMI radiation along the upper shell 140 at a target frequency. The EMI prevention fins 170 and the EMI channels 172 have sufficient length to restrict EMI radiation along the upper shell 140. In an exemplary embodiment, the EMI channels 172 are in flow communication with the airflow channel 164. The EMI prevention fins 170 may be used as heat transfer fins to transfer heat away from the interior of the pluggable body 130, and thus from the communication circuit board 138 and associated components. The EMI channels 172 allow airflow or other cooling flow along the upper wall 150 and the surfaces of the EMI prevention fins 170 to dissipate the heat therefrom.

In an exemplary embodiment, the upper wall 150 is stepped along the length of the pluggable body 130 between the cable end 134 and the mating end 132. The upper wall 150 includes a first step 180 along the airflow channel 164 and a second step 182 along the EMI channels 172. The first step 180 is elevated relative to the second step 182 closer to the top 145 of the pluggable body 130. The second step 182 is stepped downward and is located further from the top 145 than the first step 180. As such, the EMI channels 172 are deeper than the airflow channel 164. For example, the upper wall 150 along the airflow channel 164 is at a first depth from the top 145 and the upper wall 150 along the EMI channels 172 is at a second depth from the top 145 that is deeper than the first depth. From the interior of the upper shell 140, the interior chamber 144 is wider (for example, taller) along the first step 180 and the airflow channel 164 in the interior chamber 144 is narrower (for example, shorter) along the second step 182 and the EMI channels 172. By having a multi-level upper wall 150 with the first step 180 elevated in comparison to the second step 182, a greater volume of space is provided in the interior chamber 144 along the first step 180, such as for routing wires within the interior chamber 144 or positioning other components of the communication circuit board 138 within the interior chamber 144 below the first step 180.

In an exemplary embodiment, the upper wall 150 includes a ramped transition 184 between the first step 180 and the second step 182. In alternative embodiments, the transition may be defined by perpendicular walls rather than the angled ramped transition 184. In an exemplary embodiment, the EMI prevention fins 170 have angled transitions 186 along the ramped transition 184. The EMI prevention fins 170 are angled downward from distal ends of the EMI prevention fins 170 to the upper wall 150 at the first step 180. In various embodiments, the ramped transition 184 may include openings (not shown) to allow airflow through the ramped transition 184 between the exterior and the interior of the pluggable body 130.

In an exemplary embodiment, the upper shell 140 controls airflow along the upper wall 150 by providing an equal airflow per unit length through the airflow channel 164 and the EMI channels 172. For example, the airflow channel 164 has a first channel cross-sectional area and the EMI channels 172 have a second channel cross-sectional area equal to the first channel cross-sectional area. Because the EMI prevention fins 170 occupy part of the volume between the side walls 152, the EMI channels 172 are deeper than the airflow channel 164. However, the overall volume of air per unit length through the EMI channels 172 is equal to the overall volume per unit length through the airflow channel 164. The EMI prevention fins 170 include the angled transitions 186 along the ramped transition 184 between the first step 180 and the second step 182 such that the transition area has an equal airflow per unit length as the airflow channel 164 and the EMI channels 172. For example, as the depth of the upper wall 150 decreases along the ramped transition 184, the heights of the EMI prevention fins 170 are reduced. In various embodiments, the EMI prevention fins 170 may additionally or alternatively be provided on the interior of the pluggable body 130. For example, the EMI prevention fins 170 may be provided on the interior of the upper shell 140, such as along the raised section.

Figure 7:
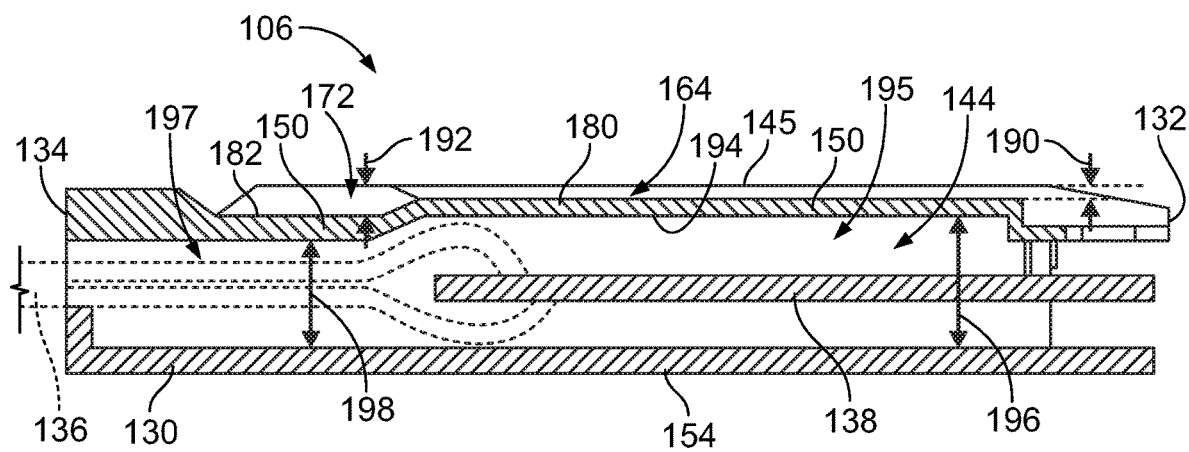
FIG. 7 is a side cross-sectional view of the pluggable module in accordance with an exemplary embodiment.
Figure 8:
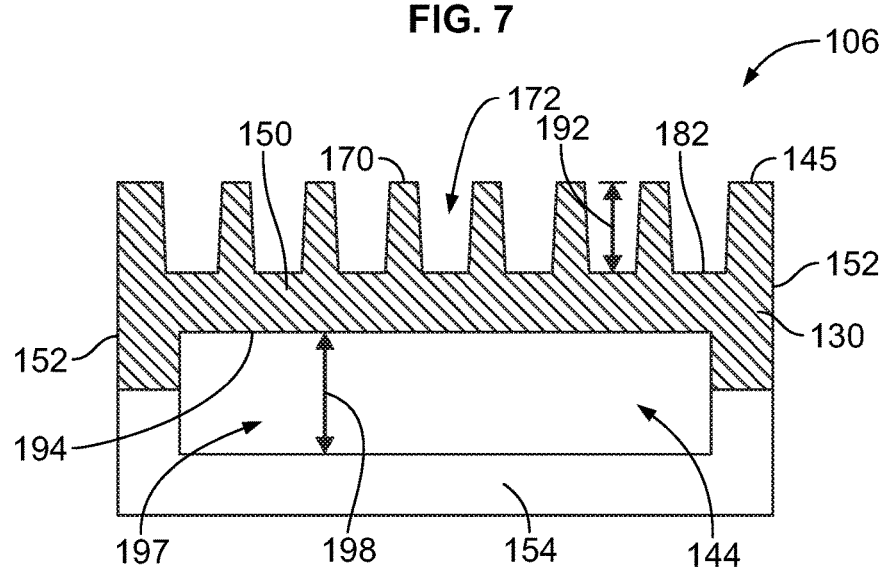
FIG. 8 is a cross-sectional view of the pluggable module in accordance with an exemplary embodiment through the EMI prevention fins and the EMI channels.
Figure 9:
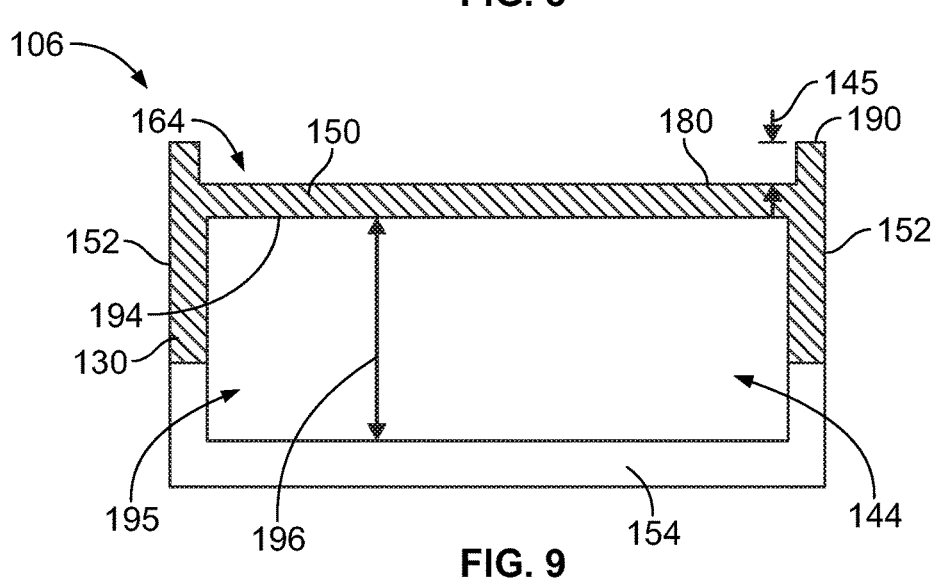
FIG. 9 is a cross-sectional view of the pluggable module in accordance with an exemplary embodiment through the airflow channel.

FIG. 7 is a side cross-sectional view of the pluggable module 106 in accordance with an exemplary embodiment. FIG. 8 is a cross-sectional view of the pluggable module 106 in accordance with an exemplary embodiment through the EMI prevention fins 170 and the EMI channels 172. FIG. 9 is a cross-sectional view of the pluggable module 106 in accordance with an exemplary embodiment through the airflow channel 164.

As shown in FIG. 7, the upper wall 150 is stepped including the first step 180 and the second step 182. The upper wall 150 is at a first depth 190 from the top 145 along the first step 180 and at a second depth 192 from the top 145 along the second step 182. The volume of air between the side walls 152 through the airflow channel 164 is equivalent to the aggregated volume of air between the side walls 152 in each of the EMI channels 172. For example, the first and second depths 190, 192 may be selected based on thicknesses of each of the EMI prevention fins 170 to provide an equivalent airflow through the airflow channel 164 and the EMI channels 172.

The upper wall 150 includes an interior surface 194 facing and defining the interior chamber 144. The interior chamber 144 has a wide section 195 aligned below the first step 180 and the airflow channel 164. The interior chamber 144 has a narrow section 197 aligned below the second step 182 and the EMI channels 172. The wide section 195 has a first height 196 between the lower wall 154 and the interior surface 194 of the upper wall 150. The narrow section 197 has a second height 198 between the lower wall 154 and the interior surface 194 of the upper wall 150. The second height 198 is less than the first height 196. The first step 180 is elevated to provide additional space in the interior chamber 144 along the wide section 195. The additional space may be used for routing the wires (shown in phantom) of the cable 136 (shown in phantom) to the communication circuit board 138 and/or for positioning components of the communication circuit board 138 within the interior chamber 144. The narrow section 197 provides additional space above the upper wall 150 for the EMI channels 172. The second step 182 is stepped downward to provide the additional depth for the EMI channels 172 compared to the airflow channel 164.

In the illustrated embodiment, the airflow channel 164 is provided rearward of the EMI prevention fins 170 and the EMI channels 172. The airflow channel 164 is provided closer to the mating end 132 of the pluggable body 130. The EMI prevention fins 170 and the EMI channels 172 are provided closer to the cable end 134, such as along the pluggable body 130 to interface with the EMI gasket 128 (shown in FIG. 1). The EMI prevention fins 170 may prevent EMI leakage at the front end of the front end 110 of the cage member 108 (both shown in FIG. 1). Other locations are possible in alternative embodiments. In an exemplary embodiment, the airflow channel 164 extends part of the length of the pluggable body 130 and the EMI channels extend another part of the length of the pluggable body 130. For example, the airflow channel 164 may have a first channel length and the EMI channels 172 may have a second channel length. Optionally, the second channel length of the EMI channels 172 may be shorter than the first channel length of the airflow channel 164. In alternative embodiments, the first and second channel lengths may be approximately equal. In other alternative embodiments, the second channel length may be longer than the first channel length.

Figure 10:
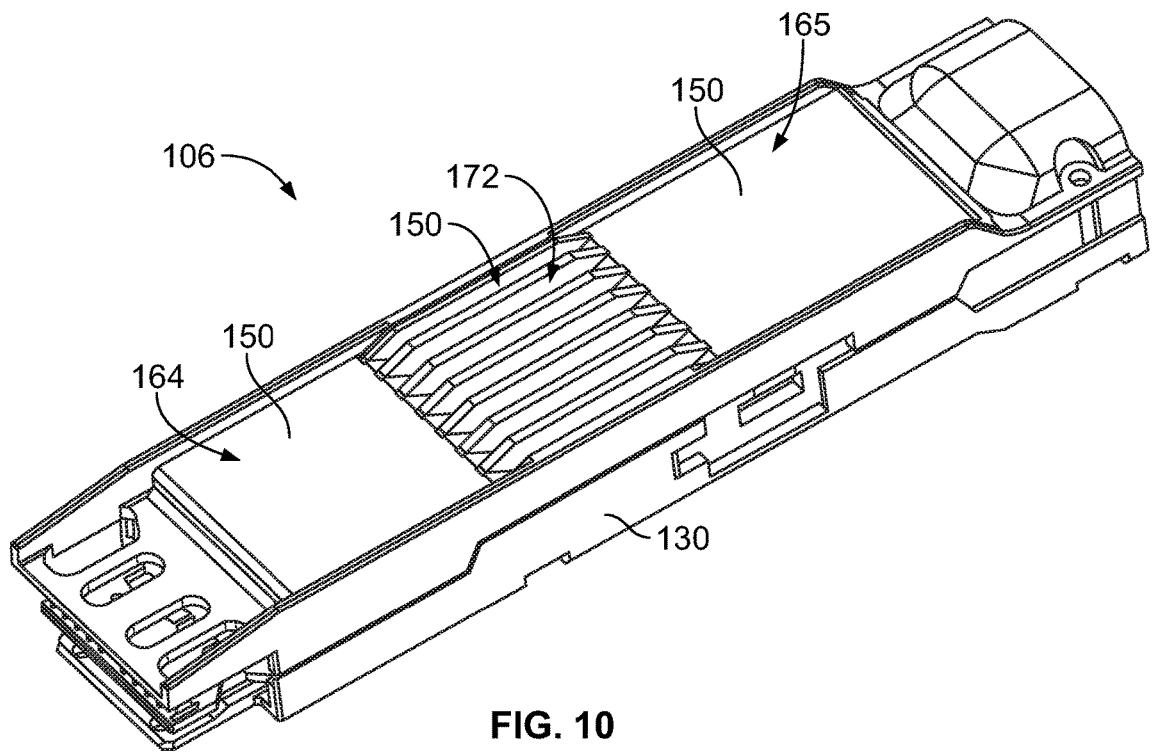
FIG. 10 is a front perspective view of the pluggable module in accordance with an exemplary embodiment.
Figure 11:
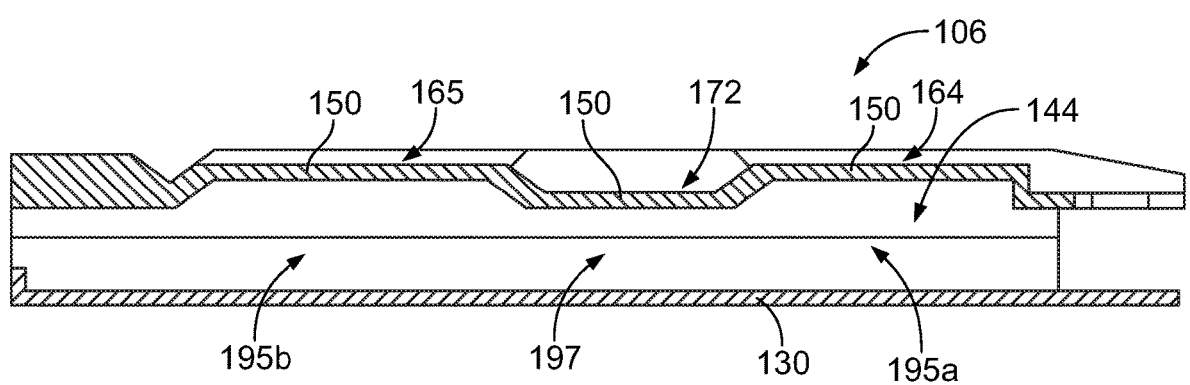
FIG. 11 is a cross-sectional view of the pluggable module in accordance with an exemplary embodiment.

FIG. 10 is a front perspective view of the pluggable module 106 in accordance with an exemplary embodiment. FIG. 11 is a cross-sectional view of the pluggable module 106 in accordance with an exemplary embodiment. In the illustrated embodiment, the EMI prevention fins 170 and the EMI channels 172 of the pluggable module 106 are approximately centered along the length of the pluggable body 130. The airflow channel 164 is provided rearward of the EMI prevention fins 170 and the EMI channels 172. A second airflow channel 165 is provided forward of the EMI prevention fins 170 and the EMI channels 172. The upper wall 150 is stepped downward at the EMI channels 172 and is stepped upward at the airflow channel 164 and the second airflow channel 165.

With reference to FIG. 11, the interior chamber 144 of the pluggable module 106 includes the narrow section 197 approximately centered along the length of the pluggable body 130 with wide sections 195*a*, 195*b* both forward and rearward of the narrow section 197. The forward wide section 195*a* provides an area of additional space within the interior chamber 144 for the individual wires to transition out of the cable jacket of the cable 136 into the interior chamber 144. The rearward wide section 195*b* provides an area of additional space within the interior chamber 144 for terminating the individual wires to the communication circuit board 138.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A pluggable module comprising:
a pluggable body having a top and a bottom, the pluggable body extending between a cable end and a mating end, the mating end being receivable in a module cavity of a receptacle assembly to mate with a communication connector, the pluggable body having an upper shell at the top and a lower shell at the bottom, the upper shell and the lower shell defining an interior chamber, the upper shell including side walls extending to the top and an upper wall extending between the side walls, the upper shell including an airflow channel along an exterior of the upper wall between the side walls allowing airflow between the cable end and the mating end, the airflow channel being open between the side walls, the upper shell including a plurality of EMI prevention fins along the upper wall having EMI channels between the EMI prevention fins, the EMI channels being in flow communication with the airflow channel, wherein the upper wall along the airflow channel is at a first depth from the top and wherein the upper wall along the EMI channels is at a second depth deeper than the first depth; and a communication circuit board held in the interior chamber of the pluggable body and exposed at the mating end, wherein the pluggable body is configured to be plugged into the receptacle assembly such that the communication circuit board is communicatively coupled to the communication connector of the receptacle assembly.

2. The pluggable module of claim 1, further comprising a cable extending into the interior chamber of the pluggable body at the cable end, the cable being coupled to the communication circuit board in the interior chamber.

3. The pluggable module of claim 1, wherein the pluggable body has a length between the cable end and the mating end, the airflow channel having a first channel length, the EMI channels having a second channel length shorter than the first channel length.

4. The pluggable module of claim 1, wherein the airflow channel is a first airflow channel, the upper shell including a second airflow channel along the exterior of the upper wall between the side walls allowing airflow between the cable end and the mating end, the EMI prevention fins and the EMI channels being located along the upper wall between the first airflow channel and the second airflow channel, the second airflow channel being at a third depth from the top, the third depth being shallower than the second depth.

5. The pluggable module of claim 1, wherein the upper wall is stepped along the length of the pluggable body between the cable end and the mating end including a first step along the airflow channel and a second step along the EMI channels, the first step being elevated relative to the second step.

6. The pluggable module of claim 5, wherein the upper wall includes a ramped transition between the first step and the second step, the EMI prevention fins having angled transitions along the ramped transition.

7. The pluggable module of claim 6, wherein the ramped transition includes openings to allow airflow through the ramped transition between the exterior and the interior of pluggable body.

8. The pluggable module of claim 1, wherein the airflow channel has substantially equal airflow per unit length as the EMI channels.

9. The pluggable module of claim 1, wherein the airflow channel has a first channel cross-sectional area and the EMI channels have a second channel cross-sectional area substantially equal to the first channel cross-sectional area.

10. The pluggable module of claim 1, wherein the interior chamber has a wide section below the airflow channel and a narrow section below the EMI channels, the wide section having a first height between the upper wall and a lower wall of the lower shell, the narrow section having a second height shorter than the first height between the lower wall and the upper wall.

11. The pluggable module of claim 1, wherein the airflow channel is open between the side walls along the exterior of the upper wall.

12. The pluggable module of claim 1, wherein each side wall has an outer edge being coplanar along the airflow channel and the EMI channels.

13. The pluggable module of claim 1, wherein the EMI prevention fins do not extend along the pluggable body at the airflow channel.

14. The pluggable module of claim 1, wherein a height of the module cavity is variable along a length of the pluggable body between the cable end and the mating end, the module cavity being taller along the airflow channel.

15. A pluggable module comprising:

a pluggable body having a top and a bottom, the pluggable body extending between a cable end and a mating end, the mating end being receivable in a module cavity of a receptacle assembly to mate with a communication connector, the pluggable body having an upper shell at the top and a lower shell at the bottom, the upper shell and the lower shell defining an interior chamber, the upper shell including side walls extending to the top and an upper wall extending between the side walls, the upper shell including an airflow channel along an exterior of the upper wall between the side walls allowing airflow between the cable end and the mating end, the upper shell including a plurality of EMI prevention fins along the upper wall having EMI channels between the EMI prevention fins, the EMI channels being in flow communication with the airflow channel and allowing airflow through the EMI channels, wherein the airflow channel has a first channel cross-sectional area and wherein the EMI channels have a second channel cross-sectional area substantially equal to the first channel cross-sectional area, and wherein the upper wall is stepped along the length of the pluggable body between the cable end and the mating end including a first step along the airflow channel and a second step along the EMI channels, the first step being elevated relative to the second step; and a communication circuit board held in the interior chamber of the pluggable body and exposed at the mating end, wherein the pluggable body is configured to be plugged into the receptacle assembly such that the communication circuit board is communicatively coupled to the communication connector of the receptacle assembly.

16. The pluggable module of claim 15, further comprising a cable extending into the interior chamber of the pluggable body at the cable end, the cable being coupled to the communication circuit board in the interior chamber.

17. The pluggable module of claim 15, wherein the upper wall along the airflow channel is at a first depth from the top and wherein the upper wall along the EMI channels is at a second depth deeper than the first depth.

18. The pluggable module of claim 15, wherein the interior chamber has a wide section below the airflow channel and a narrow section below the EMI channels, the wide section having a first height between the upper wall and a lower wall of the lower shell, the narrow section having a second height shorter than the first height between the lower wall and the upper wall.

19. A pluggable module comprising:

a pluggable body having a top and a bottom, the pluggable body extending between a cable end and a mating end, the mating end being receivable in a module cavity of a receptacle assembly to mate with a communication connector, the pluggable body having an upper shell at the top and a lower shell at the bottom, the upper shell and the lower shell defining an interior chamber, the lower shell having side walls and a lower wall between the side walls at the bottom, the upper shell including side walls extending to the top and an upper wall extending between the side walls, the side walls of the upper shell coupled to the side walls of the lower shell, the upper shell including an airflow channel along an exterior of the upper wall between the side walls allowing airflow between the cable end and the mating end, the upper shell including a plurality of EMI prevention fins along the upper wall having EMI channels between the EMI prevention fins, the EMI channels being in flow communication with the airflow channel, the interior chamber having a wide section having a first height between the lower wall and the upper wall, the interior chamber having a narrow section having a second height shorter than the first height between the lower wall and the upper wall, the wide section being aligned below the airflow channel, the narrow section being aligned below the EMI channels, wherein the upper wall is stepped along the length of the pluggable body between the cable end and the mating end including a first step along the airflow channel and a second step along the EMI channels, the first step being elevated relative to the second step; and a communication circuit board held in the interior chamber of the pluggable body and exposed at the mating end, wherein the pluggable body is configured to be plugged into the receptacle assembly such that the communication circuit board is communicatively coupled to the communication connector of the receptacle assembly.

20. The pluggable module of claim 19, further comprising a cable extending into the interior chamber of the pluggable body at the cable end, the cable being coupled to the communication circuit board in the interior chamber.

21. The pluggable module of claim 19, wherein the airflow channel has a first channel cross-sectional area and wherein the EMI channels have a second channel cross-sectional area substantially equal to the first channel cross-sectional area, the airflow channel having similar airflow per unit length as the EMI channels.

22. The pluggable module of claim 19, wherein the upper wall along the airflow channel is at a first depth from the top and wherein the upper wall along the EMI channels is at a second depth deeper than the first depth.

\* \* \* \* \*